US010406558B2

(12) United States Patent
Döhring et al.

(10) Patent No.: US 10,406,558 B2
(45) Date of Patent: Sep. 10, 2019

(54) COATED BOARD OF WOOD-BASED MATERIAL

(71) Applicant: Kronoplus Technical AG, Niederteufen (CH)

(72) Inventors: Dieter Döhring, Zabeltitz (DE); Hans Schaefer, Zabeltitz (DE); Udo Hanitzsch, Bielefeld (DE)

(73) Assignee: Xylo Technologies AG, Niederteufen (CH)

( * ) Notice: Subject to any disclaimer, the term of this patent is extended or adjusted under 35 U.S.C. 154(b) by 479 days.

(21) Appl. No.: 14/976,436

(22) Filed: Dec. 21, 2015

(65) Prior Publication Data

US 2016/0129473 A1 May 12, 2016

Related U.S. Application Data

(63) Continuation of application No. 12/516,069, filed as application No. PCT/EP2007/010215 on Nov. 23, 2007, now abandoned.

(30) Foreign Application Priority Data

Nov. 23, 2006 (WO) ................. PCT/EP2006/011246

(51) Int. Cl.
*B05D 7/06* (2006.01)
*B05C 1/14* (2006.01)
(Continued)

(52) U.S. Cl.
CPC .................. *B05D 7/06* (2013.01); *B05C 1/14* (2013.01); *B05D 3/067* (2013.01); *B05D 7/542* (2013.01);
(Continued)

(58) Field of Classification Search
None
See application file for complete search history.

(56) References Cited

U.S. PATENT DOCUMENTS 2,989,420 A * 6/1961 Zdanowski ........... C08F 279/02 428/497
3,924,021 A * 12/1975 Maruyama ........ C08F 299/0421 427/503
(Continued)

FOREIGN PATENT DOCUMENTS

DE 102004031547 3/2005
DE 102004031547 A1 * 3/2005 ............... B05D 7/06
(Continued)

OTHER PUBLICATIONS

Braun R. et al., Mar. 17, 2005, machine translation of DE 102004031547A1 (Year: 2005).*
(Continued)

*Primary Examiner* — Chinessa T. Golden
(74) *Attorney, Agent, or Firm* — Renner, Otto, Boisselle and Sklar, LLP

(57) ABSTRACT

A coated board of wood-based material and a method for coating a board of wood-based material, wherein the board of wood-based material is in particular a wall panel or floor panel or is intended for producing such a panel, comprising a front side and a rear side, wherein at least the surface of the front side is provided with a polymer coating and wherein the polymer coating has a hardness gradient, so that the hardness of the polymer layer decreases with increasing depth from the surface.

16 Claims, 4 Drawing Sheets

(51) Int. Cl.

| | |
|---|---|
| ***B05D 3/06*** | (2006.01) |
| ***B05D 7/00*** | (2006.01) |
| ***E04F 13/10*** | (2006.01) |
| ***E04F 15/04*** | (2006.01) |
| *B05C 1/00* | (2006.01) |

(52) U.S. Cl.

CPC ............ *E04F 13/10* (2013.01); *E04F 15/045* (2013.01); *B05C 1/003* (2013.01); *B05D 2252/04* (2013.01); *Y10T 156/1002* (2015.01); *Y10T 428/31989* (2015.04)

(56) References Cited

U.S. PATENT DOCUMENTS 6,652,919 B1 * 11/2003 Campbell .............. B05D 7/574 427/379
2003/0153643 A1 * 8/2003 Jin ........................... C08K 3/22 522/81
2004/0142115 A1 7/2004 Jaworek et al.

FOREIGN PATENT DOCUMENTS

| | | |
|---|---|---|
| EP | 1 799 635 | 9/2005 |
| EP | 1634995 | 3/2006 |
| EP | 1645339 | 4/2006 |
| WO | 2006 037644 | 4/2006 |
| WO | 2007/042258 | 4/2007 |

OTHER PUBLICATIONS

International Preliminary Report on Patentability for application No. PCT/EP2007/010215 dated Jun. 11, 2009.

International Search Report for application No. PCT/EP2007/010215 completed Feb. 11, 2008.

* cited by examiner

COATED BOARD OF WOOD-BASED MATERIAL

This application is a continuation of U.S. patent application Ser. No. 12/516,069 filed Dec. 14, 2009, which is a National Phase Application of PCT/EP2007/010215 filed Nov. 23, 2007, which claims priority to International Patent Application No. PCT/EP2006/011246 filed Nov. 23, 2006, which are all hereby incorporated herein by reference in their entirety.

1. FIELD OF THE INVENTION

The present invention relates to a coated board of wood-based material, in particular for producing a floor, ceiling or wall covering as well as a method for coating a board of wood-based material.

2. BACKGROUND

A plurality of covering boards on wood-based material are known from the prior art. In the simplest case such a board consists of a solid real wood. Such boards of solid wood are however very expensive and as panels it only can be laid by well skilled specialists. However, such so-called real wood planks provide a highly attractive surface. In order to avoid high costs of real wood floorings and to provide the attractive surface of such floorings at the same time, veneer covering boards have been developed. Veneer are thin sheets, as a rule 0.3 to 0.8 mm, from a high quality wood which are applied with glue to a base material. As a rule, the base materials consist of cheaper wood-based materials and are strikingly thicker than the veneer layer. A drawback of such coverings is the relative sensitive surface which, for example, can be easily damaged by means of wetness or by means of mechanical action.

Furthermore, laminate panels for floor or ceiling coverings are known from the prior art. In comparison with the covering boards mentioned at the beginning, laminate panels are relative inexpensive. As a rule, laminate panel consists of a 4 to 12 mm thick base board of MDF or HDF raw material thus of a relative low priced wood-based material wherein onto its upper side a paper printed with a décor is bonded. As a rule, at the bottom side of the base board there is situated a so-called counteracting paper which is to counteract a distortion of the base board by means of the applied décor layer. In order to improve the durability of the décor layer, a so-called overlay paper is typically applied onto the décor layer wherein the overlay paper is impregnated with a resin, for example an amino resin, and onto the resin are applied very fine abrasion-resistant particles as for example aluminium oxide particles. By pressing under application of heat and pressure the different layers of the laminate panel are joint together and the used resins are cured. Therefore, the result is a durable abrasion-resistant decorative surface.

In order to improve the durability and thus also the optical properties of the boards of wood-based material, as they are used for example for wall, ceiling or floor panel, there have been recommended several methods for coating and materials the prior art. In principle such coatings can be applied onto any kind of board of wood-based material, including the above mentioned real wood panels and laminate panels, in order to increase the durability of the surfaces.

For example, a method for coating of a board of wood-based material is known from the WO 2007/042258 A1, wherein in a single coating step a relative thick protective layer of plastic material is applied onto the surface of a board. The used plastic material thereby is a polymerisation able acrylate system which can cure by means of a polymerisation. The polymerisation is started by means of radiation so that a complete conversion occurs through the thickness of the applied layer.

Based from these prior art there is the object to provide a coated board of wood-based material and also a method for coating aboard comprising specific advantageous mechanical properties.

These and other objects will be apparent in the following description or will be recognizable from the person skilled in the art and will be solved with a coated board of wood-based material according to claim 1 and with a method for coating according to claim 9.

By means of the present invention abrasion values of the highest abrasion grade AC 5 according to prEN 15468 are achieved by optical good transparency of the coating and furthermore by good brilliance of a printed design applied underneath or therein. The surface is characterized by high micro scratch resistant (Mar-Resistance) and impact resistance according to grade 33 (prEN 15468). The characteristic values for chemical resistance and water vapor resistance, castor chair test and case leg test are certain in accordance with the prEN 15468. Furthermore, the method allows a surface in which additionally to the pressure a deep embossed decorative structure for example a brushed wood structure or a stone structure can be brought in. The invention is therefore particularly suitable for providing of floor panels.

3. DETAILED DESCRIPTION OF THE INVENTION

The coated board of wood-based material is in particular a floor, ceiling or wall panel and respectively a board of wood-based material which is provided for further processing to a floor, ceiling or wall panel, and comprises a front side and a rear side wherein at least the surface of the front side is provided with a polymer coating. The term board of wood-based material is to understand wide and comprises for example both boards made of real wood and boards made MDF, HDF, chip boards, composite boards, OSB boards and the like. The board of wood-based material can further be provided with additional coatings, papers, veneers or the like onto their surfaces of front side and/or rear side. Thus, when a coating of the surface of the board of wood-based material is mentioned, this necessarily means not a direct coating of the board of wood-based material, but the same for example can be provided with a décor paper, wherein the coating is then applied onto the décor paper. According to the invention the polymer coating comprises a hardness gradient after curing so that the hardness of the polymer layer decreases with increasing depth viewed from the surface. That is, the polymer layer has preferably the maximum hardness at its outer surface and has the minimum hardness nearby the boundary surface between coating and surface of the board of wood-based material, with a decreasing course between the both extremes.

Up to now it has always been desired to achieve preferably a maximum hardness over the over-all layer thickness. The coating according to the invention deviates from this teaching and however surprisingly results in excellent mechanical durability values. An explanation therefore could be that by means of a preferably steady decrease of hardness there not occur high peaks in the properties of the coating and therefore the coating is particularly durable.

The present invention also relates to a method for coating a board of wood-based material, in particular a floor, ceiling or wall panel, and respectively to a board of wood-based material which is processed to a floor panel, wherein in a first step a first liquid coating means is applied onto a board of wood-based material and onto the still wet first coating means a second liquid coating means is applied, wherein the liquid layers penetrate each other according to the physics of liquids. The outcome of this is a gradient of the concentration of both liquids. While in the outer areas of the total layer (upper side respectively lower side of the over-all layer) the respective liquid of the original single layers is pre-dominant, there exists a concentration gradient of the first liquid and respectively of the second liquid to the center and along to the respective other side of the layer. In the ideal case the respective gradient course corresponds to a straight line. Since in case of higher viscous liquids at short mixing times interruptions may occur to the ideal case, one has to assume that the effective concentration curves only approximately correspond to straight lines and deviations are possible. When the liquids for example are polymerisation able acrylate systems, which are different in the double pond rate, so it follows from the above mentioned that analog to the concentration gradient of the both liquids together, a gradient arises in the number of the double bonds from one side to the other side of the layer. When now a polymerisation is actuated in such a layer, for example by means of UV radiation, and one assume that under inert conditions an almost complete conversion of the double bonds occurs so there arise a polymer layer with a gradient of the cross-linking points. While the side with high double bond concentration is accordingly strong cross-linked, the other side with the low double bond rate has accordingly a lower cross-linking. According to the polymer physics the hardness of such a system gives an information of the cross-linking density. When, for example, the micro hardness (Martens hardness DIN EN ISO 14577) is measured within a layer which is accordingly produced from two polymerisation able liquids, there occurs a hardness gradient analog to the cross-linking density. The layer can be removed in stages for example with a Taber-Abrasion-Test (Taber-Abraser-Test) according to EN 13329. The curve progression of the hardness gradient similarly corresponds to the above described concentration gradient of both liquids. In the ideal case of the mixing of the liquids straight lines occur. In practice, however, there will occur deviations to the straight lines. Mathematical it may therefore be expected that the function y=f(x) has a progression deviating from a straight line (wherein y is the Martens hardness and x is the abrasion depth in the layer).

The described context shall be illustrated to the person skilled in the art with the following example:

Onto a HDF base board a first layer of 45 g/m$^2$ is rolled on via a roll applicator wherein the coating means of the first layer for example consists of 35% from a 1,6 hexanediol diacrylate and of 65% from a polyester acrylate. A second layer with a mass of 40 g/m$^2$ is immediately applied thereafter onto this layer wherein the coating means of the second layer for example consists of a mixture of 70% polyurethane acrylic ester and of 30% dipropylene diacrylate. Both layers presently include a photoinitiater. The so produced liquid over-all layer is subjected to a UV radiation under nitrogen atmosphere and the over-all layer is polymerized. The double bond conversion thereby is approximately 98%.

In order to analyze the resultant coating, the coating has subsequently gradually been removed with the Taber-Abraser-Test by means of respectively 200 rotations (described in the EN 13329). The Martens hardness was respectively measured of each an abrasion step. When one chart in a coordinate system the Martens hardness in N/mm$^2$ to the y-axis and the corresponding abrasion depth in μm to the x-axis, the outcome of this is approximately a straight line with the y=134.8−1.03 x. The coefficient of determination has been determined with 87.8% which shows a very high accuracy of this mathematical correlation for wood-based materials.

When coatings according to the invention for example are used for a hard-wearing floor covering the layers may additionally be provided with abrasion-resistant particles, such as fine corundum particles. These particles may for example be present in one or both coating means in a dispersion before the coating process or the particles can be spread onto the still wet bat already applied coating means in a separate process step.

The person skilled in the art recognizes on the basis of the present description of the invention that according to the application coating means can be used with other concentrations as preferably denoted in the example. Preferably the concentration of 1,6 hexanediol diacrylate can be between 10 and 60%, more preferably between 20 and 40%; the concentration of polyester acrylate can be between 40 and 90%, more preferably between 50 and 80%; the concentration of polyurethane acrylic ester can be between 45 and 95 more preferably between 55 and 75% and the concentration of dipropylen glycol diacrylate can be between 5 and 55%, more preferably between 15 and 35%. The mentioned substances shall clarify the principle of a layer with hardness gradients according to a preferred embodiment. It is self-evident that a plurality of further or other polymerisation able substances can be used instead of the above mentioned. Polymerisation able acrylates are particularly preferred substances for the herein described coatings.

The coating means of the first layer as well as of the second layer and may be of farther layers can consist of a single polymerise able substance or of mixtures of substances. Particularly preferred suitable substances are polymerising able acrylates as in general and here in particular the substances: 1,6 hexanediol diacrylate, polyester acrylate, polyurethane acrylic ester and dipropylen glycol diacrylate. Particularly suitable for the first layer is a mixture of 1,6 hexanediol diacrylate and polyester acrylate. For the second layer is a mixture of polyurethane acrylic ester and dipropylen glycol diacrylate particularly suitable.

In the coatings means further additives can be present such as flow additives, wetting additives, dyestuffs, abrasion-resistant particles and so on. Important therefore is that these further components allow the above described cross-linking and penetration, respectively, and that a polymerisation is still possible.

By selecting of the coating means for the single layer the mentioned substances are preferred, however, the person skilled in the art recognizes that it does not depend on the use of the denoted substances but substantially on the provision of polymerise able coating means.

DETAILED DESCRIPTION OF EXEMPLARY EMBODIMENTS

To the following, a detailed description of exemplary embodiments will be given by means of the enclosed diagrams and figures.

Figure 1:
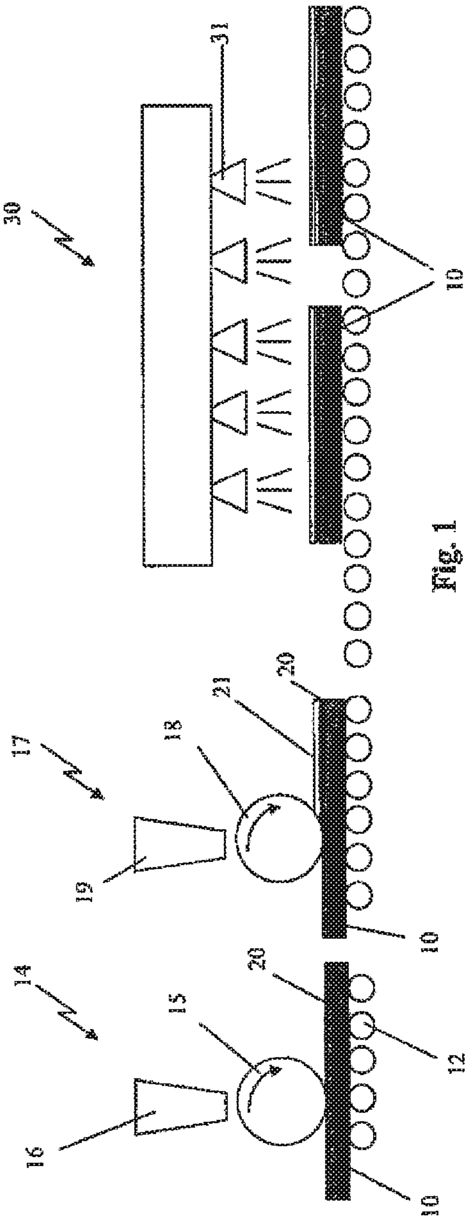
FIG. 1 is a schematic illustration of a coating process.

In FIG. 1 a coating plant for coating of boards of wood-based material 10 is schematically shown. The boards of wood-based material 10, such as boards of solid wood, HDF, MDF or chip boards, are guided by means of a roller conveyer plant 12 through the different stations of the coating plant. In a first coating station 14 a first liquid coating means 20 is applied in a passage coating onto the boards of wood-based material 10 by means of a rotating applicator roller 15.

The applicator roller 15 is provided with coating means by means of a supply device 16. In the second coating station 17 a second liquid coating means 21 is applied onto the still wet first coating means 20 by means of a further rotating applicator roller 18. The applicator roller 18 is provided with the second liquid coating means by means of a supply device 19. It is self-evident that the applying can also be done with any other suitable applying process, such as by means of a spraying device or a coating blade or the like. Therefore, it is only important that the applying of the second layer takes place as long as the first layer is still wet enough, so that a partial mixing of the two layers can take place. Furthermore, it is self-evident that further coating stations can be provided after the second coating station 17 in order to apply for example a third liquid coating means onto the still wet second coating means 21 or also additional stations in order to apply abrasion-resistant particles onto and respectively into the wet layers.

After leaving of the coating station 17 the coated boards 10 are conveyed to a hardening station 30, where the layers are hardened by means of UV radiators 31. On their way from the coating station 17 to the hardening station 30 a partial mixing of the liquid coating means 20 and 21 occurs, which particularly takes place at the boundary surfaces of the two coating means. Thereby, naturally the mixing is stronger, the closer one is located at the boundary surface of the two layers. By curing of the layers in the curing station 30 the mixing process is stopped and the once adjusted mixing proportion and therefore the mechanical properties of the produced coating is set. The extent of the mixing at the boundary surfaces which takes place itself and preferably without external mechanical action depends on the time duration which passes between the applying of the second coating means 21 onto the still wet first coating means 20 and the curing in the curing station 30. Furthermore, the mixing of the two coating means is also influenced by the respective viscosity of the coating means wherein the general rule is that the higher the viscosity, the lower the mixing per time unit.

Figure 2A:
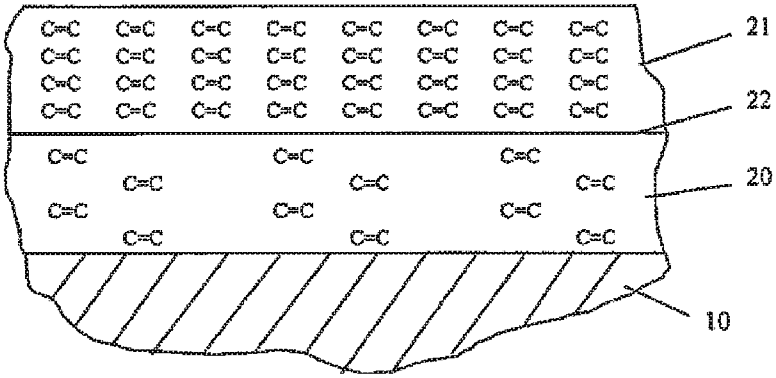
FIG. 2A to 2C are schematic illustrations in which the procedure of mixing of two liquid layers is shown.
Figure 2B:
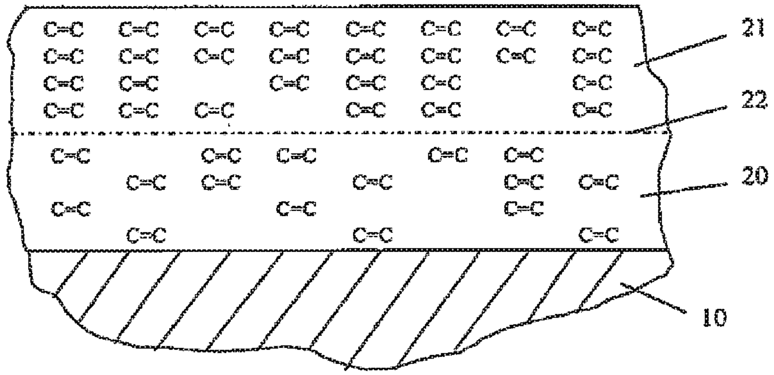
Figure 2C:
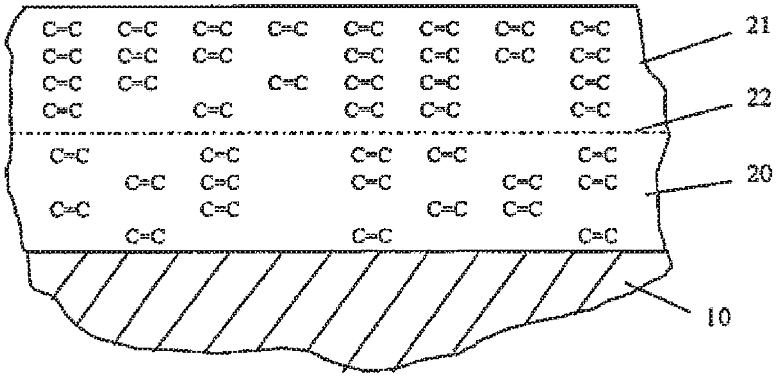

The principle of the mixing of the two applied coating means can be seen best from the schematically illustration of FIG. 2A to 2C. Therefore, FIG. 2A shows the condition of the two coating means 20 and 21 applied onto a board of wood-based material 10 immediately after applying of the second coating means 21. At that time practically no mixing has taken place. In the present case, the coating means 20 and 21 are polymers, which have respectively different numbers of C—C carbon double bonds. Therefore, as schematically depicted in FIG. 2A, the first coating means 20 has a lower number of C—C double bonds than the second coating means 21. Due to the higher number of C—C double bonds in the coating means 21, the same will have a higher hardness after the curing than the coating means 20 which is provided with lower amount of C—C double bonds.

As the two coating means 20 and 21 are applied wet on wet, a mixing of the two layers occurs starting from the boundary surface 22 of the two layers, as it is indicated in FIG. 2B. This means that due to the mixing process in the area close to the boundary surface 22 there are more double bonds in the underlying layer and accordingly in the area close to the boundary surface 22 of the overlying layer there are fewer double bonds, as before the mixing. FIG. 2C shows the two layers after the mixing has advanced some more and has reached a suitable mixing grade. If at this point of time the curing of the coating means occurs, for example by means of UV radiation, this mixing rate is set, since in the hardened layers naturally no mixing can occur any more.

Figure 3:
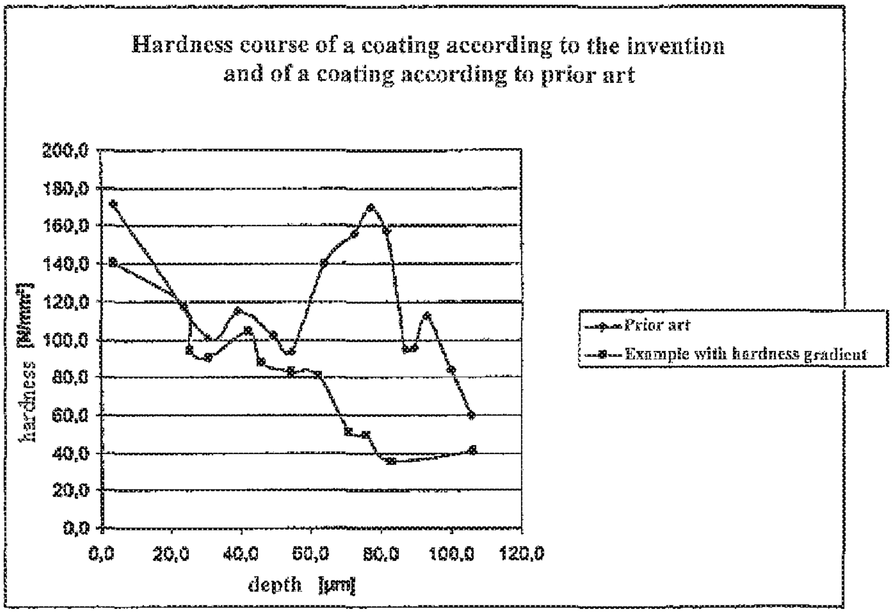
FIG. 3 is a diagram, which shows the course of the hardness against the depth of the coating.

In the diagram of FIG. 3 the hardness course of a coating according to the invention (example with hardness gradient) and a coating according to the prior art are plotted. The example according to the invention consisted of an abraded board of wood-based material provided with a primer on which the two different coating means were applied wet on wet. The first applied coating means consisted of approximately 35% 1,6 hexanediol diacrylate and approximately 65% polyester acrylate and was applied with 45 g/m$^2$. The second coating means which was applied onto the still wet first layer consisted of approximately 70% polyurethane acrylic ester and approximately 30% dipropylene glycol diacrylate and was applied with 40 g/m$^2$. After applying of the second layer there was a waiting time of 10 seconds in order to make it possible for the viscous liquid materials to mix. Afterwards, the two layers were completely hardened together.

The example according to the state of the prior art consisted of a conventional coating, wherein multiple thin layers of materials were applied separately and wherein between the respective applying procedures the pre-applied layer was hardened. The lower three layers consisted of a mixture of 70% polyester acrylate and 30% 1,6 hexanediol diacrylate with an applying intensity of 12 g/m$^2$. The two upper layers consisted of 70% polyurethane glycol diacrylate and 30% dipropylene acrylic ester and the two upper layers contained 15% corundum with an average particle size of D 50 of 25 μm.

The test was carried out according to the European standard for laminate panels DIN EN 13329 with a Taber-Abraser-Tester 5151 of Taber Industries. After 200 rotations respectively with S-41 abrasive paper the hardness and the trace depth of the samples were determined. The determination of the Martens hardness (registering hardness test under test application of a force) was carried out according to DIN EN ISO 14577. A "Fischerscope H100" of Helmut Fischer GmbH was used as a test apparatus. The following test parameters were used: maximal strength: 50/30 mN as well as measuring period: 20 seconds. The determination of the trace depth was carried out with a mechanic brush analyzer. A Perthometer S3P of Perthen was used as a test apparatus.

During the measurement of the samples it became apparent that probably due to the used relative soft materials more or less deviations occur in the hardness of a given layer depth. Therefore, it is necessary to measure at several points in order to get representative data by means of an average determination. During the carried out measurements the hardness as well as the trace depth was respectively measured after 200 rotations of the abrasive paper at four points. It became apparent that in most of the majority of cases four measurement points provide a sufficient accuracy. It is self-evident that one can get more accurate measurement results by using more than four measuring points, like eight for example.

In the below depicted table the individual measured data for the sample of the example according to the invention are depicted. The measurement was carried out on the completely cured coating that means the condition in which respective products would be really used as floor panel.

TABLE 1

| Example with hardness gradient | | | | | | | | | | | | |
|---|---|---|---|---|---|---|---|---|---|---|---|---|
| | depth trace [μm] | | | | depth measurement of hardness [μm] | | | | Martens hardness [N/mm$^2$] | | | |
| rotation | 1 | 2 | 3 | 4 | 1 | 2 | 3 | 4 | 1 | 2 | 3 | 4 |
| | | | | | 3.6 | 3.8 | 3.3 | 3.4 | 134.8 | 118.7 | 159.0 | 150.6 |
| AV | | | | | | 3.5 | | | | 140.8 | | |
| 200 | 20.0 | 20.0 | 20.0 | 20.0 | 3.5 | 3.7 | 4.3 | 3.9 | 139.7 | 125.2 | 93.5 | 112.2 |
| AV | | 20.0 | | | | 3.9 | | | | 117.7 | | |
| 400 | 20.0 | 20.0 | 20.0 | 25.0 | 4.5 | 5.0 | 4.0 | 3.9 | 65.9 | 69.9 | 106.9 | 113.2 |
| AV | | 21.3 | | | | 4.4 | | | | 84.5 | | |
| 600 | 25.0 | 25.0 | 25.0 | 30.0 | 4.7 | 4.7 | 4.3 | 4.0 | 60.5 | 79.6 | 95.0 | 106.1 |
| AV | | 26.3 | | | | 4.4 | | | | 90.3 | | |
| 800 | 30.0 | 30.0 | 30.0 | 35.0 | 4.1 | 4.1 | 4.0 | 4.2 | 103.8 | 103.1 | 109.7 | 100.3 |
| AV | | 31.3 | | | | 4.1 | | | | 104.2 | | |
| 1000 | 40.0 | 40.0 | 40.0 | 45.0 | 4.7 | 4.2 | 3.9 | 4.5 | 78.5 | 99.3 | 112.0 | 87.5 |
| AV | | 41.3 | | | | 4.3 | | | | 94.3 | | |
| 1200 | 50.0 | 50.0 | 50.0 | 50.0 | 4.3 | 5.4 | 4.2 | 4.8 | 93.7 | 59.8 | 98.6 | 82.6 |
| AV | | 50.0 | | | | 4.6 | | | | 83.7 | | |
| 1400 | 55.0 | 55.0 | 60.0 | 60.0 | 5.4 | 4.5 | 4.0 | 5.0 | 60.1 | 85.0 | 106.7 | 70.6 |
| AV | | 57.5 | | | | 4.7 | | | | 80.7 | | |
| 1600 | 60.0 | 65.0 | 70.0 | 70.0 | 4.7 | 4.4 | 4.3 | 4.6 | 47.8 | 53.6 | 55.5 | 48.9 |
| AV | | 66.3 | | | | 4.5 | | | | 51.5 | | |
| 1800 | 65.0 | 70.0 | 75.0 | 75.0 | 4.0 | 4.6 | 4.9 | 5.3 | 64.5 | 50.1 | 43.7 | 37.1 |
| AV | | 71.3 | | | | 4.7 | | | | 48.9 | | |
| 2000 | 75.0 | 80.0 | 80.0 | 75.0 | 5.8 | 4.9 | 6.2 | 6.0 | 31.3 | 43.6 | 27.3 | 41.6 |
| AV | | 77.5 | | | | 5.5 | | | | 38.0 | | |
| 2200 | 95.0 | 105.0 | 105.0 | 100.0 | 4.5 | 5.1 | 6.1 | 4.9 | 51.4 | 40.8 | 28.1 | 43.7 |
| AV | | 101.3 | | | | 5.2 | | | | 41.0 | | |

In the above depicted table the column "rotation" indicates the number of rotations which were carried out with the Taber-Abraser-Tester. The column "depth trace" indicates how many micrometer material of the coating starting from the original surface was removed at the four measuring points 1-4. The column "depth measurement of hardness" indicates how many micrometers the test pin entered into the coating at the four measuring points 1-4 respectively, in the column "Martens hardness" the hardness is indicated in Newton per mm$^2$ for the four measuring points 1-4 respectively. Below the individual values the respective average value for the four measuring points is indicated. From the above depicted table it is easy to recognize that the Martens hardness decreases the deeper one penetrate into the completely cured layer. It is also apparent that at 800 and 1000 (over-all) rotations a moderate rise of the Martens hardness can be noted. This is due to the irregular mixing of the two used coating means which in the praxis can only fully be avoided.

Nevertheless it is apparent in the diagram of FIG. 3 that in the example with hardness gradient there is a nearly continuous decrease of hardness without great peaks. However, the comparison example according to the state of the prior art does not show such a continuous progress of the hardness, but moreover at a depth of 60 to 80 μm it has a pronounced point of discontinuity up to the original initial hardness.

The average values of the test sample are depicted in the below-mentioned table 2.

TABLE 2

| Average values of the example with hardness gradient | | | |
|---|---|---|---|
| rotation | depth [μm] | Martens hardness [N/mm$^2$] | Standard deviation of the Martens hardness [N/mm$^2$] |
| | 3.5 | 140.8 | 15.4 |
| 200 | 23.9 | 117.7 | 17.0 |
| 400 | 25.6 | 94.5 | 17.6 |
| 600 | 30.7 | 90.3 | 11.0 |
| 800 | 42.1 | 104.2 | 3.4 |
| 1000 | 45.8 | 87.5 | 12.6 |
| 1200 | 54.8 | 82.8 | 14.9 |
| 1400 | 62.2 | 80.7 | 17.4 |
| 1600 | 70.8 | 51.4 | 3.2 |
| 1800 | 76.0 | 48.9 | 10.1 |
| 2000 | 83.0 | 36.9 | 6.8 |
| 2200 | 106.4 | 41.0 | 8.4 |

The values of the comparison test sample according to the prior art are shown in the below-mentioned tables 3 and 4.

TABLE 3

| Sample according to prior art | | | | | | | | | | | | |
|---|---|---|---|---|---|---|---|---|---|---|---|---|
| | depth trace [μm] | | | | depth measurement of hardness [μm] | | | | Martens hardness [N/mm²] | | | |
| rotation | 1 | 2 | 3 | 4 | 1 | 2 | 3 | 4 | 1 | 2 | 3 | 4 |
| | | | | | 3.1 | 3.5 | 3.1 | 3.0 | 180.6 | 141.8 | 173.1 | 192.4 |
| AV | | | | | | 3.2 | | | | 172.0 | | |
| 200 | 30.0 | 25.0 | 25.0 | 25.0 | 4.2 | 4.2 | 3.7 | 4.7 | 99.9 | 99.6 | 124.5 | 79.3 |
| AV | | 26.3 | | | | 4.2 | | | | 100.8 | | |
| 400 | 35.0 | 35.0 | 35.0 | 35.0 | 3.7 | 3.8 | 4.0 | 4.1 | 126.9 | 117.2 | 110.1 | 105.3 |
| AV | | 35.0 | | | | 3.9 | | | | 114.9 | | |
| 600 | 45.0 | 45.0 | 45.0 | 45.0 | 3.7 | 3.8 | 4.6 | 4.8 | 128.4 | 122.2 | 83.2 | 74.7 |
| AV | | 45.0 | | | | 4.2 | | | | 102.1 | | |
| 800 | 50.0 | 50.0 | 50.0 | 50.0 | 4.0 | 4.7 | 4.8 | 4.0 | 108.2 | 80.9 | 75.4 | 110.9 |
| AV | | 50.0 | | | | 4.4 | | | | 93.8 | | |
| 1000 | 60.0 | 60.0 | 60.0 | 60.0 | 3.5 | 3.1 | 4.0 | 3.6 | 143.7 | 177.4 | 108.0 | 129.9 |
| AV | | 60.0 | | | | 3.6 | | | | 139.8 | | |
| 1200 | 66.0 | 70.0 | 70.0 | 70.0 | 3.3 | 3.4 | 3.6 | 3.0 | 160.7 | 145.1 | 135.0 | 186.1 |
| AV | | 68.8 | | | | 3.3 | | | | 156.5 | | |
| 1400 | 70.0 | 75.0 | 75.0 | 75.0 | 3.3 | 3.0 | 3.1 | 3.8 | 157.7 | 191.6 | 178.0 | 119.3 |
| AV | | 73.8 | | | | 3.3 | | | | 161.7 | | |
| 1600 | 76.0 | 80.0 | 80.0 | 80.0 | 2.3 | 2.9 | 2.6 | 2.4 | 183.6 | 124.8 | 147.9 | 174.4 |
| AV | | 78.8 | | | | 2.6 | | | | 157.7 | | |
| 1800 | 80.0 | 85.0 | 85.0 | 85.0 | 3.8 | 3.0 | 3.4 | 3.1 | 71.4 | 112.3 | 88.6 | 107.0 |
| AV | | 83.8 | | | | 3.3 | | | | 94.5 | | |
| 2000 | 85.0 | 90.0 | 85.0 | 85.0 | 5.1 | 3.5 | 2.6 | 3.0 | 40.9 | 82.3 | 146.4 | 112.6 |
| AV | | 86.3 | | | | 3.6 | | | | 95.6 | | |
| 2200 | 85.0 | 95.0 | 90.0 | 90.0 | 3.6 | 3.0 | 3.0 | 2.7 | 81.2 | 116.0 | 114.5 | 137.5 |
| AV | | 90.0 | | | | 3.1 | | | | 112.3 | | |
| 2400 | 90.0 | 100.0 | 100.0 | 95.0 | 3.7 | 5.2 | 3.1 | 3.0 | 77.6 | 39.7 | 108.2 | 111.8 |
| AV | | 96.3 | | | | 3.8 | | | | 84.3 | | |
| 2600 | 100.0 | 100.0 | 105.0 | 100.0 | 5.3 | 3.3 | 5.0 | 3.9 | 37.8 | 92.6 | 42.4 | 67.7 |
| AV | | 101.3 | | | | 4.4 | | | | 60.1 | | |

TABLE 4

| Average values of the sample according to the prior art | | | |
|---|---|---|---|
| rotation | depth [μm] | Martens hardness [N/mm²] | Standard deviation of the Martens hardness [N/mm²] |
| | 3.2 | 172.0 | 18.7 |
| 200 | 30.4 | 100.8 | 16.0 |
| 400 | 38.9 | 114.9 | 8.1 |
| 600 | 49.2 | 102.1 | 23.5 |
| 800 | 54.4 | 93.8 | 15.9 |
| 1000 | 63.6 | 139.8 | 25.2 |
| 1200 | 72.1 | 156.5 | 18.9 |
| 1400 | 77.1 | 169.7 | 27.3 |
| 1600 | 81.3 | 167.7 | 23.1 |
| 1800 | 87.1 | 94.8 | 16.1 |
| 2000 | 89.8 | 95.6 | 38.9 |
| 2200 | 93.1 | 112.3 | 20.1 |
| 2400 | 100.0 | 84.3 | 29.0 |
| 2600 | 105.7 | 60.1 | 21.9 |

It has turned out experimentally that especially good mechanical properties of the complete over-all layer can be achieved, if the hardness gradient of the finished over-all layer—like it is shown in an exemplary manner in FIG. 3—essentially corresponds to the following formula:

$$(-3.0*x)+C\leq Y(x)\leq(-0.2*x)+C$$

wherein:

x is the absolute value of the depth in μm of the coating viewed from the surface of the coating;

Y(x) is the absolute value of the hardness in $N/mm^2$ at a certain depth x; and C is the absolute value of the initial hardness in $N/mm^2$ of the coating at a depth of approximately x≈0-5 μm.

Under the "absolute" values it is to be understood that in the above formula only the plain numerical value is entered that means without the associated measuring unit "μm" and "$N/mm^2$" respectively. It for example, the initial value of the above example with hardness gradient is 140.8 $N/mm^2$ (see table 2), in the above table are inserted only the absolute values, that means C=140.8. In the same way for x is inserted only the absolute values, for example x=3.5. The result of this is, for example, upper and lower boundaries for Y(x=3.5) of 140.1 and 130.3 respectively. At a depth of x=40 μm the result is then, for example, 132.8 for the upper boundary and 20.8 for the lower boundary respectively. These upper and lower boundaries for Y(x) have the measurement unit $N/mm^2$. Important is that the absolute values, starting from the mentioned measurement units "μm" and "$N/mm^2$", are used in the formula and not starting, for example, from "mm" or "$N/m^2$". It should be clear for the person skilled in the art that the above formula is no mathematical formula to the description of the hardness gradient itself, but it rather defines a range, in which it should run.

The initial value of hardness of the coating is the value in the first few μm of the coating. Due to the typically used measurement method by means of a test pin which penetrates a few μm into the coating, it is difficulty to determine the hardness for the depth of penetration "0 μm". The formulation "substantially" is therefore elected because it is difficulty to achieve a perfect uniform mixing of the materials so that in reality it can always come to single tiny outliers, such as the hardness value of 104.2 Newton/$mm^2$ at a depth of 42.1 μm (see table 2) of the above discussed example with hardness gradient. Furthermore, the values very close to the surface of the board of wood-based material are generally inaccurate, since the residual layer thickness to be measured must have a certain minimum thickness in order to allow useful measurements. The residual layer thickness for useful measurements should therefore be at least 5 μm, preferably 10 μm and further preferably at least 20 μm. With other words, the last 20 μm of the layer, close to the board of wood-based material, must not necessarily follow the above mentioned preferred hardness gradient although this is naturally preferred.

In a further preferred embodiment the hardness gradient substantially follows the following formula:

$$(-2.5*x)+C\leq Y(x)\leq(-0.4*x)+C$$

And in another further preferred embodiment it substantially follows:

$$(-2.0*x)+C\leq Y(x)\leq(-0.6*x)+C$$

Figure 4:
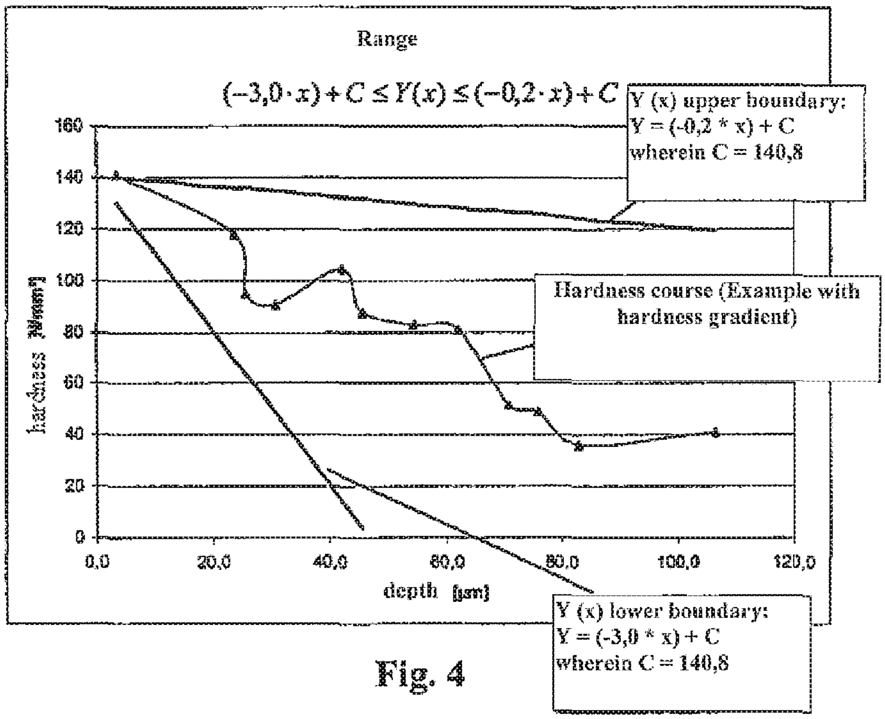
FIG. 4 is a diagram, which illustrates the upper and lower boundaries of the hardness gradient according to a preferred embodiment of the invention.
Figure 5:
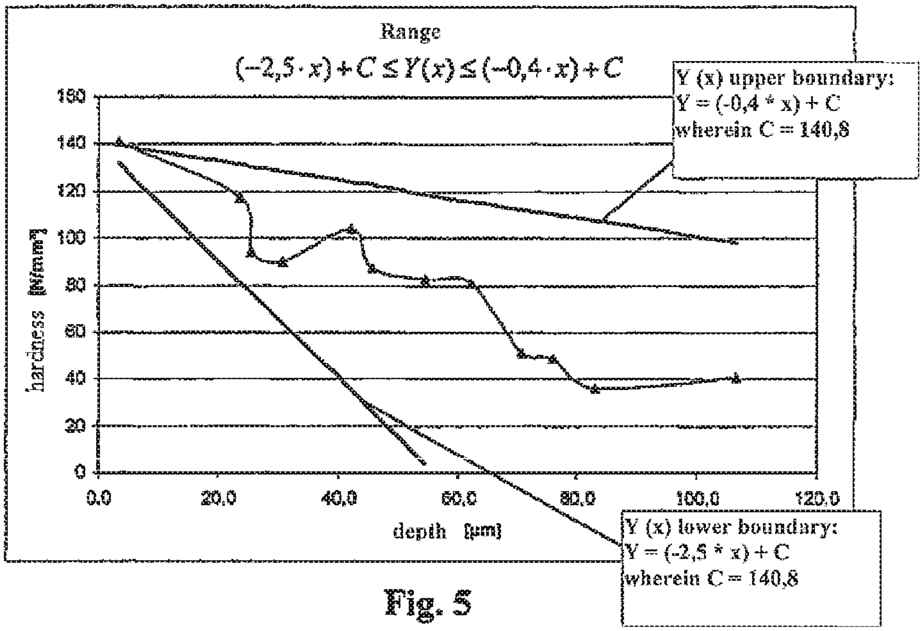
FIG. 5 is a diagram, which illustrates the upper and lower boundaries of a more preferred embodiment of the invention.
Figure 6:
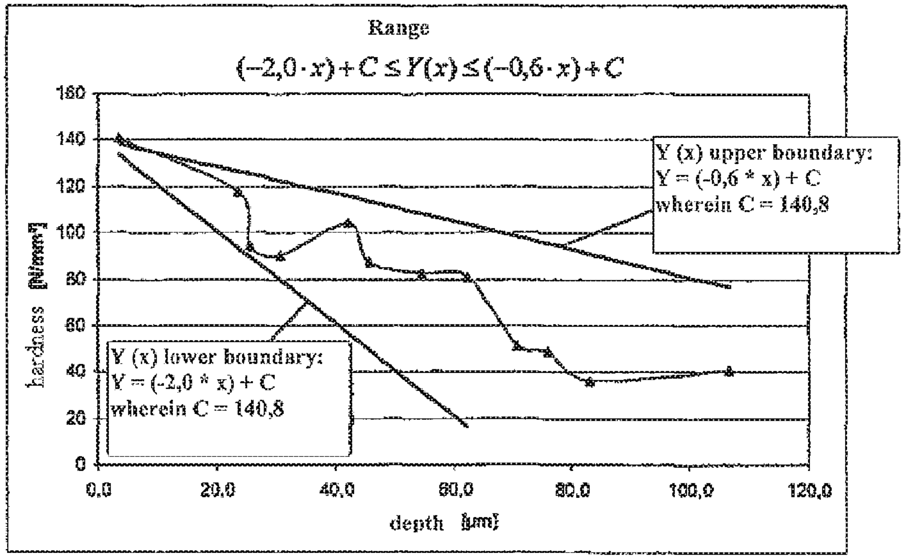
FIG. 6 is a diagram, which illustrates the upper and lower boundaries of the hardness gradient of a further preferred embodiment.

In the FIG. 4 to 6 the meaning of the above mentioned formulas of hardness gradients are illustrated according to examples with hardness gradient. It should be clear that the indicated absolute values for hardness and depth are only exemplary. It is self-evident that it is possible to apply over-all layers with significant larger thicknesses or lower thicknesses. Furthermore, the absolute value of hardness certainly depends on the used materials and can also be larger or lesser than the values of the example with hardness gradient. However, the order of magnitude of the cited values for the example with hardness gradient is most preferred and suitable for the use in a floor panel.

The person skilled in the art recognizes by means of the detailed description of the method according to the invention how he can achieve a coating of a board of wood-based material according to the invention. This means naturally that all materials mentioned and named in connection with the description of the methods, such as the substances for the coating means, can also be used by the coating of the board of wood-based material according to the invention.

The presented method is in particular suitable for coating of floor panels, and respectively for coating of boards of wood-based materials which are subsequently further to floor panels processed since the advantageously mechanical properties of the hardness gradient have here a strong effect. In the same way the presented coated board of wood-based material is for the same reason preferably a floor panel and respectively a coated board of wood-based material, which is intended to be further processed to a floor panel.

The invention claimed is:

1. A coated board of wood-based material, comprising a board of wood-based material having a front side and a rear side, and a polymer coating on the front side of the board of wood-based material, wherein the polymer coating has an inner area predominantly formed of a first polymer having a first hardness in a cured state, an outer area predominantly formed of a second polymer having a second hardness in a cured state that is greater than the first hardness, the first polymer being different than the second polymer, and an intermediate area between the inner and outer areas, the intermediate area having a concentration gradient of the first and second polymers, the concentration of the first polymer in the intermediate area continuously decreasing going from the inner area toward the outer area and the concentration of the second polymer in the intermediate area continuously decreasing going from the outer area toward the inner area, such that the hardness of the polymer coating continuously decreases with increasing depth viewed from an outer surface of the polymer coating.

2. The coated board of wood-based material according to claim 1, wherein the polymer coating has a hardness gradient that corresponds to the following formula:

$$(-3,0*x)+C<=Y(x)<=(-0,2*x)+C$$

wherein:

x is the absolute value of the depth in μm of the coating viewed from the surface of the coating;

Y(x) is the absolute value of the hardness in N/mm$^2$ at a certain depth x; and C is the absolute value of the initial hardness in N/mm$^2$ of the coating at a depth of approximately x≈0-5 μm.

3. The coated board of wood-based material according to claim 1, wherein the polymer coating has a hardness gradient that corresponds to the following formula:

$$(-2,5*x)+C<=Y(x)<=(-0,4*x)+C$$

wherein:

x is the absolute value of the depth in μm of the coating viewed from the surface of the coating;

Y(x) is the absolute value of the hardness in N/mm$^2$ at a certain depth x; and C is the absolute value of the initial hardness in N/mm$^2$ of the coating at a depth of approximately x≈0-5 μm.

4. The coated board of wood-based material according to claim 1, wherein the polymer coating has a hardness gradient that corresponds to the following formula:

$$(-2,0*x)+C<=Y(x)<=(-0,6*x)+C$$

wherein:

x is the absolute value of the depth in μm of the coating viewed from the surface of the coating;

Y(x) is the absolute value of the hardness in N/mm$^2$ at a certain depth x; and C is the absolute value of the initial hardness in N/mm$^2$ of the coating at a depth of approximately x≈0-5 μm.

5. The coated board of wood-based material according to claim 1, wherein the board of wood-based material is a chip board, MDF board, HDF board, OSB board or real wood board.

6. The coated board of wood-based material according to claim 1, wherein the polymer coating consists of polymers which are curable by means of radiation.

7. The coated board of wood-based material according to claim 1, wherein the polymer coating has an initial Martens hardness at a depth of approximately 0-5 μm from 120 N/mm$^2$ to 250 N/mm$^2$ measured according to DIN ISO 14577.

8. The coated board of wood-based material according to claim 1, wherein the polymer coating has an initial Martens hardness at a depth of approximately 0-5 μm from 130 N/mm$^2$ to 200 N/mm$^2$ measured according to DIN ISO 14577.

9. The coated board of wood-based material according to claim 1, wherein the polymer layer includes abrasion-resistant particles.

10. The coated board of wood-based material according to claim 9, wherein the abrasion-resistant particles include corundum particles.

11. A floor covering comprising a plurality of the coated boards of wood-based material according to claim 1.

12. A floor panel made by a method comprising the following steps:

a) providing a board of wood-based material having a front side and a back side;

b) applying a first liquid coating to the front side of the board of wood-based material, the first liquid coating being formed of a first polymer composition that has a first hardness in a cured state;

c) applying a second liquid coating onto the still wet first liquid coating, so that a partial mixing of the first and second liquid coatings takes place, the second liquid coating being formed of a second polymer composition having a second hardness in a cured state that is greater than the first hardness, the first polymer composition being a different polymer composition than the second polymer composition;

d) exposing the first and second liquid coatings to radiation to effect curing of the first and second liquid coatings to form a polymer coating on the board of wood-based material; and wherein the partial mixing of the first and second polymer compositions forms a concentration gradient of the first and second polymer compositions in an intermediate area of the polymer coating disposed between an inner area of the polymer coating predominantly formed of the first polymer composition and an outer area of the polymer coating predominantly formed of the second polymer composition, the concentration of the first composition in the intermediate area continuously decreasing going from the inner area toward the outer area and the concentration of the second composition in the intermediate area continuously decreasing going from the outer area toward the inner area, such the hardness of the polymer coating when cured decreases with increasing depth viewed from an outer surface of the polymer coating.

13. The floor panel according to claim 12, wherein the polymer coating has a hardness gradient that corresponds to the following formula:

$$(-3{,}0*x)+C<=Y(x)<=(-0{,}2*x)+C$$

wherein:

x is the absolute value of the depth in μm of the coating viewed from the surface of the coating;

Y(x) is the absolute value of the hardness in $N/mm^2$ at a certain depth x; and C is the absolute value of the initial hardness in $N/mm^2$ of the coating at a depth of approximately x≈0-5 μm.

14. The floor panel according to claim 12, wherein the polymer coating has a hardness gradient that corresponds to the following formula:

$$(-2{,}5*x)+C<=Y(x)<=(-0{,}4*x)+C$$

wherein:

x is the absolute value of the depth in μm of the coating viewed from the surface of the coating;

Y(x) is the absolute value of the hardness in $N/mm^2$ at a certain depth x; and C is the absolute value of the initial hardness in $N/mm^2$ of the coating at a depth of approximately x≈0-5 μm.

15. The floor panel according to claim 12, wherein the polymer coating has a hardness gradient that corresponds to the following formula:

$$(-2{,}0*x)+C<=Y(x)<=(-0{,}6*x)+C$$

wherein:

x is the absolute value of the depth in μm of the coating viewed from the surface of the coating;

Y(x) is the absolute value of the hardness in $N/mm^2$ at a certain depth x; and C is the absolute value of the initial hardness in $N/mm^2$ of the coating at a depth of approximately x≈0-5 μm.

16. A coated board of wood-based material, comprising a board of wood-based material having a front side and a rear side, and a polymer coating on the front side of the board of wood-based material, wherein the polymer coating has an inner area predominantly formed of a first polymer having a first hardness in a cured state, an outer area predominantly formed of a second polymer having a second hardness in a cured state that is greater than the first hardness, the second polymer comprising more C—C double bonds than the first polymer, and an intermediate area between the inner and outer areas, the intermediate area having a concentration gradient of the first and second polymers, the concentration of the first polymer in the intermediate area continuously decreasing going from the inner area toward the outer area and the concentration of the second polymer in the intermediate area continuously decreasing going from the outer area toward the inner area, such that the hardness of the polymer coating continuously decreases with increasing depth viewed from an outer surface of the polymer coating.

* * * * *